United States Patent
Barnes et al.

(10) Patent No.: US 11,946,487 B2
(45) Date of Patent: Apr. 2, 2024

(54) COMPRESSOR COMPRISING A FLOW GUIDE DISPOSED WITHIN AN AIR INLET

(71) Applicant: Dyson Technology Limited, Wiltshire (GB)

(72) Inventors: Hannah Kathryn Barnes, Swindon (GB); Nigel Youatt Dymond, Swindon (GB); Adam Janiszewski, Gloucester (GB)

(73) Assignee: Dyson Technology Limited, Wiltshire (GB)

( * ) Notice: Subject to any disclaimer, the term of this patent is extended or adjusted under 35 U.S.C. 154(b) by 17 days.

(21) Appl. No.: 17/640,008

(22) PCT Filed: Aug. 19, 2020

(86) PCT No.: PCT/GB2020/051983
§ 371 (c)(1),
(2) Date: Mar. 3, 2022

(87) PCT Pub. No.: WO2021/044115
PCT Pub. Date: Mar. 11, 2021

(65) Prior Publication Data
US 2022/0325722 A1 Oct. 13, 2022

(30) Foreign Application Priority Data
Sep. 5, 2019 (GB) ..................................... 1912783

(51) Int. Cl.
*F04D 29/44* (2006.01)
*A47L 9/22* (2006.01)
(Continued)

(52) U.S. Cl.
CPC .............. *F04D 29/441* (2013.01); *A47L 9/22* (2013.01); *F04D 29/403* (2013.01); *H02K 5/207* (2021.01); *H02K 7/083* (2013.01); *H02K 21/16* (2013.01)

(58) Field of Classification Search
CPC .... F04D 29/441; F04D 29/403; F04D 25/082; F04D 29/4213; F04D 29/5806;
(Continued)

(56) References Cited

U.S. PATENT DOCUMENTS 6,710,486 B1  3/2004  Horng et al.
7,281,908 B2  10/2007  Fujita et al.
(Continued)

FOREIGN PATENT DOCUMENTS

CN    101713404 A    5/2010
DE       4037754 A1    6/1991
(Continued)

OTHER PUBLICATIONS

International Search Report and Written Opinion received for PCT Patent Application No. PCT/GB2020/051983, dated Oct. 30, 2020, 15 pages.
(Continued)

*Primary Examiner* — Jacob M Amick
*Assistant Examiner* — Charles J Brauch
(74) *Attorney, Agent, or Firm* — Tucker Ellis LLP; Michael G. Craig

(57) ABSTRACT

A compressor has a stator assembly, a rotor assembly, and a housing within which the stator assembly and the rotor assembly are located. The housing has a first end, a second end, and an air inlet disposed between the first and second ends. The compressor has a flow guide disposed within the air inlet. The flow guide is configured to split air flowing through the air inlet in use into a first airflow toward the first
(Continued)

end of the housing and a second airflow toward the second end of the housing.

17 Claims, 8 Drawing Sheets

(51) Int. Cl.
*F04D 29/40* (2006.01)
*H02K 5/20* (2006.01)
*H02K 7/08* (2006.01)
*H02K 21/16* (2006.01)

(58) Field of Classification Search
CPC .... F04D 29/584; F04D 25/06; F04D 29/5813; F04D 17/10; F04D 29/582; F04D 29/624; A47L 9/22; H02K 5/207; H02K 7/083; H02K 21/16; H02K 9/06
See application file for complete search history.

(56) References Cited

U.S. PATENT DOCUMENTS

| | | | |
|---|---|---|---|
| 2006/0073030 A1* | 4/2006 | McAuliffe | F04D 29/4213 417/366 |
| 2006/0202572 A1 | 9/2006 | Tungl et al. | |
| 2018/0363664 A1* | 12/2018 | Daneshkhah | H02K 9/06 |
| 2018/0363679 A1 | 12/2018 | Johnson | |
| 2019/0123611 A1 | 4/2019 | Belanger et al. | |

FOREIGN PATENT DOCUMENTS

| | | |
|---|---|---|
| DE | 102013226543 A1 | 6/2015 |
| EP | 2247838 A2 | 11/2010 |
| EP | 3125411 A1 | 2/2017 |
| JP | 2002-272061 A | 9/2002 |
| JP | 2008-133811 A | 6/2008 |
| JP | 2011-509375 A | 3/2011 |
| JP | 2011-099386 A | 5/2011 |
| JP | 2019-007485 A | 1/2019 |
| KR | 2002-0024708 A | 4/2002 |
| KR | 2009-0012615 A | 2/2009 |
| TW | 521300 B | 2/2003 |
| WO | 2006/067736 A1 | 6/2006 |
| WO | 2018/234740 A1 | 12/2018 |

OTHER PUBLICATIONS

Search Report received for Great Britain Patent Application No. 1912783.6, dated Feb. 3, 2020, 1 page.

Office Action received for Japanese Patent Application No. 2022-514731, dated Apr. 4, 2023, 12 pages (7 pages of English Translation and 5 pages of Original Document).

* cited by examiner

COMPRESSOR COMPRISING A FLOW GUIDE DISPOSED WITHIN AN AIR INLET

CROSS-REFERENCE TO PRIOR APPLICATION

This application is a § 371 National Stage Application of PCT International Application No. PCT/GB2020/051983 filed Aug. 19, 2020, which claims the priority of United Kingdom Application No. 1912783.6, filed Sep. 5, 2019, each of which are herein incorporated by reference in their entirety.

FIELD OF THE INVENTION

The present invention relates to a compressor, and a vacuum cleaner comprising such a compressor.

BACKGROUND OF THE INVENTION

There is a general desire to improve compressors, such as the compressors found in vacuum cleaners, in a number of ways. In particular, improvements may be desired in terms of size, weight, manufacturing cost, performance, efficiency, reliability and noise.

One of the biggest challenges faced with electric motors is keeping the components of the electric motor cool during use. In the case of compressors, the airflow generated by the compressor can be utilised to cool some of the components of the motor. However, it is often the case that the airflow through the compressor is restricted, and is not able to flow past all the components effectively. Therefore the efficiency and performance of the compressor may be limited by the restricted cooling available to a small number of the components.

SUMMARY OF THE INVENTION

According to a first aspect of the present invention there is provided a compressor comprising a stator assembly, a rotor assembly, and a housing within which the stator assembly and the rotor assembly are located, wherein the housing comprises a first end, a second end, and an air inlet disposed between the first and second ends, the compressor comprises a flow guide disposed within the air inlet, and the flow guide is configured to split air flowing through the air inlet in use into a first airflow toward the first end of the housing and a second airflow toward the second end of the housing.

The compressor according to the first aspect of the present invention may be advantageous principally as the housing comprises a first end, a second end, and an air inlet disposed between the first and second ends, the compressor comprises a flow guide disposed within the air inlet, and the flow guide is configured to split air flowing through the air inlet in use into a first airflow toward the first end of the housing and a second airflow toward the second end of the housing.

In particular, the flow guide may enable airflow flowing through the compressor in use to be spread to both the first and second ends of the housing. This may provide increased airflow over a larger number of components contained within the housing, which may lead to enhanced cooling of components contained within the housing of the compressor, for example enhanced cooling of components such as bearings and/or magnets and/or electronic devices. This may enable the compressor to be run at greater operating powers than, for example, a similar compressor which does not have the air guide.

Furthermore, the flow guide may provide greater flexibility in location of components of the compressor in the housing. For example, as the flow guide is configured to split air flowing through the air inlet in use into a first airflow toward the first end of the housing and a second airflow toward the second end of the housing, there may be a greater degree of design freedom as cooling airflow is present at both the first and second ends of the housing.

The flow guide may provide increased flexibility for the location of the air inlet into the housing. In particular, as the flow guide can be used to divert airflow to both the first and second ends of the housing, the air inlet may, for example, be located at a region remote from the first and second ends of the housing. This may provide greater structural rigidity than, for example, a compressor where the air inlet is located at or close to an end of the housing.

The air inlet may be spaced apart from the first and second ends of the housing. This may provide greater mechanical strength than, for example, an arrangement where the air inlet is located at or very close to an end of the housing.

The flow guide may be configured such that the first and second airflows are in generally opposing directions. For example, the flow guide may be configured such that there is an oblique angle between the first and second airflows. The flow guide may be configured such that there is an angle of greater than 45°, greater than 60°, or greater than 90° between the first and second airflows.

The air inlet may be substantially orthogonal to a principal direction of airflow through the housing in use.

The first end of the housing may be closed, for example substantially sealed from the external environment of the compressor. Use of the flow guide with a compressor where the first end is closed may be beneficial as the flow guide may divert the first airflow toward the first end of the housing, which otherwise would not receive any airflow by virtue of the first end being closed.

The first end of the housing may be closed by control circuitry of the compressor. This may be beneficial as the first airflow may flow towards and/or over at least a portion, for example an underside of, the control circuitry in use, thereby providing a cooling effect for the control circuitry. The first end of the housing may be closed by a printed circuit board (PCB).

The rotor assembly may comprise at least one magnet which is disposed within the first end of the housing, for example a sensor magnet or the like. This may be beneficial as magnets may comprise components which are particularly sensitive to temperature. The flow guide may divert the first airflow toward the magnet, which may provide a cooling effect for the magnet, thereby increasing the lifetime of the magnet. The at least one magnet may be disposed within the first end of the housing such that the at least one magnet is at least partially misaligned with the air inlet. This be beneficial as the magnet may be remote from the air inlet, yet still receive a cooling airflow by virtue of the flow guide diverting the first airflow toward the first end of the housing. The at least one magnet may be disposed within the first end of the housing such that the at least one magnet is at least partially misaligned with the air inlet in an axial direction of the compressor. For example, the at least one magnet may be axially offset from the air inlet such that a main body of the at least one magnet is offset in an axial direction from the air inlet.

The rotor assembly may comprise an impeller, and the impeller may, for example, be disposed within the second end of the housing. The impeller may be configured generate airflow through the housing in use. A principal direction of airflow through the housing in use may be toward the second end of the housing. A principal direction of airflow through the housing in use may be toward the impeller, for example along a principal axis extending from the first end of the housing to the second end of the housing. The principal axis may be substantially orthogonal to the first and/or second ends of the housing.

The second airflow may be in a direction toward the impeller, and the first airflow may be in a direction away from the impeller. The first airflow may be turned toward the second end of housing after the first airflow reaches the first end of housing in use, for example turned toward the second end of the housing by the action of the impeller.

The rotor assembly may comprise a shaft having first and second ends disposed in respective first and second ends of the housing. The air inlet may be configured such that air enters the air inlet in a direction substantially orthogonal to the shaft in use. The first airflow in use may be directed toward the first end of the shaft and the second airflow in use may be directed toward the second end of the shaft. The air inlet may located between the first and second ends of the shaft. The impeller may be located at the second end of the shaft. The principal axis may be substantially parallel to the shaft.

The housing may be substantially cylindrical in global form, and the air inlet may be located on a curved surface of the housing. This may be beneficial as it may enable greater flexibility in location of the air inlet relative to, for example, an arrangement where the air inlet is located on an end of the housing.

The flow guide may be shaped to create the first and/or second airflows. For example, the flow guide may comprise a guide surface shaped to create the first airflow.

The flow guide may be disposed within the air inlet so as to define first and second inlet apertures. The first inlet aperture may be at least partially occluded by a guide surface of the flow guide that directs airflow to the first end of housing. The second inlet aperture may be substantially free of occlusions.

The guide surface may be angled toward the first end of the housing. The guide surface may be obliquely angled relative to the housing, for example obliquely angled relative to a curved surface of the housing. The guide surface may be obliquely angled relative to an interior curved surface of the housing.

The flow guide may be disposed at least partially within the air inlet. For example at least a portion of the flow guide may extend into an interior of the housing. The guide surface may extend into an interior of the housing. The guide surface may extend axially within the interior of the housing, for example toward the first end of the housing. The guide surface may extend axially past a perimeter edge of the air inlet, for example axially past a perimeter edge of the air inlet into the interior of the housing and toward the first end of the housing.

The flow guide and the housing may comprise a single component, for example a single component formed in a single moulding procedure. This may be beneficial as it may reduce the number of manufacturing steps, and may reduce the cost of the manufacturing process.

The flow guide and the housing may comprise separate components attached to one another by fixing means. This may be beneficial as it may enable the flow guide to be retrofitted to the housing, for example for existing compressors having a similar structure. The fixing means may comprise at least one clip formed on the flow guide and/or the housing. This may be beneficial as it may provide a relatively simple fixing means, which may allow for ease of attachment of the flow guide to the housing.

The fixing means may extend axially past the guide surface in a first direction, and the guide surface may extend axially past the fixing means in a second opposing direction. This may be beneficial as it may enable the fixing means to extend along a relatively large proportion of the air inlet whilst still enabling the formation of an air inlet aperture for the second airflow, and may enable the fixing means to extend along a relatively large proportion of the air inlet whilst still enabling the guide surface to extend into the interior of the housing.

The air inlet may comprise a window formed in the housing, the window having at least two opposing edges. The flow guide may comprise at least two clips that are engagable with the at least two opposing edges to locate the flow guide within the air inlet. This may be beneficial as it may provide an attachment of increased strength relative to, for example, an attachment that utilises a single clip. The guide surface may be obliquely angled relative to the at least two clips. This may be beneficial as it may enable the guide surface to be obliquely angled relative to the housing whilst the at least two clips engage with the opposing edges of the air inlet.

The housing may comprise a plurality of air inlets and a single flow guide, with the single flow guide disposed within a single air inlet. This may be beneficial as sufficient cooling may be achieved with a single flow guide. This may be simpler, and use less parts than, an arrangement using a plurality of flow guides, and may result in a reduced cost of manufacture. Use of a single flow guide whilst having a plurality of air inlets may also provide a lower pressure drop than, for example, an arrangement utilising a flow guide disposed in each of the plurality of air inlets. Where the compressor is utilised in a vacuum cleaner, such an arrangement may provide a lower drop in airwatts than, for example, an arrangement utilising a flow guide disposed in each of the plurality of air inlets, whilst still providing an adequate level of cooling.

The housing may comprise a plurality of air inlets and a plurality of flow guides, each flow guide being disposed within a respective air inlet. This may be beneficial as it may direct more airflow toward the second end of the housing than, for example, an arrangement that utilises a single flow guide, and may provide enhanced cooling.

The rotor assembly may comprise a rotor magnet and at least one bearing. The rotor magnet and the at least one bearing may be disposed in the housing at least partially between the air inlet and the second end of the housing. This may be beneficial as the second airflow may flow over the rotor magnet and the at least one bearing in use, thereby providing cooling of the rotor magnet and the at least one bearing.

The rotor assembly may comprise a first bearing located at the first end of the housing and a second bearing located at the second end of the housing. For example, the first bearing may be located between the air inlet and the first end of the housing and the second bearing may be located between the air inlet and the second end of the housing. This may be beneficial as the first airflow may flow over the first bearing in use, and the second airflow may flow over the second bearing in use, thereby providing cooling for both the first and second bearings. The rotor magnet may be located between the first and second bearings.

The stator assembly may comprise at least one stator core, and at least one phase winding wound around the at least one stator core. The at least one stator core and the at least one phase winding may be disposed in the housing at least partially between the air inlet and the second end of the housing. This may be beneficial as the second airflow may flow over the at least one stator core and the at least one phase winding in use, thereby providing cooling of the at least one stator core and the at least one phase winding.

According to a second aspect of the present invention there is provided a vacuum cleaner comprising a compressor according to the first aspect of the present invention.

According to a third aspect of the present invention there is provided a flow guide for a compressor, the flow guide comprising fixing means for fixing the flow guide within an air inlet of a compressor, and a guide surface for splitting air flowing through the air inlet in use into first and second airflows.

The guide surface may be obliquely angled relative to the fixing means. The fixing means may extend axially past the guide surface in a first direction, and the guide surface may extend axially past the fixing means in a second opposing direction. The fixing means may comprise at least one clip. For example, the fixing means may comprise at least two clips disposed on lateral surfaces of the flow guide.

Optional features of aspects of the present invention may be equally applied to other aspects of the present invention, where appropriate.

BRIEF DESCRIPTION OF THE DRAWINGS

In order to better understand the present invention, and to show more clearly how the invention may be put into effect, the invention will now be described, by way of example, with reference to the following drawings.

DETAILED DESCRIPTION

Figure 1:
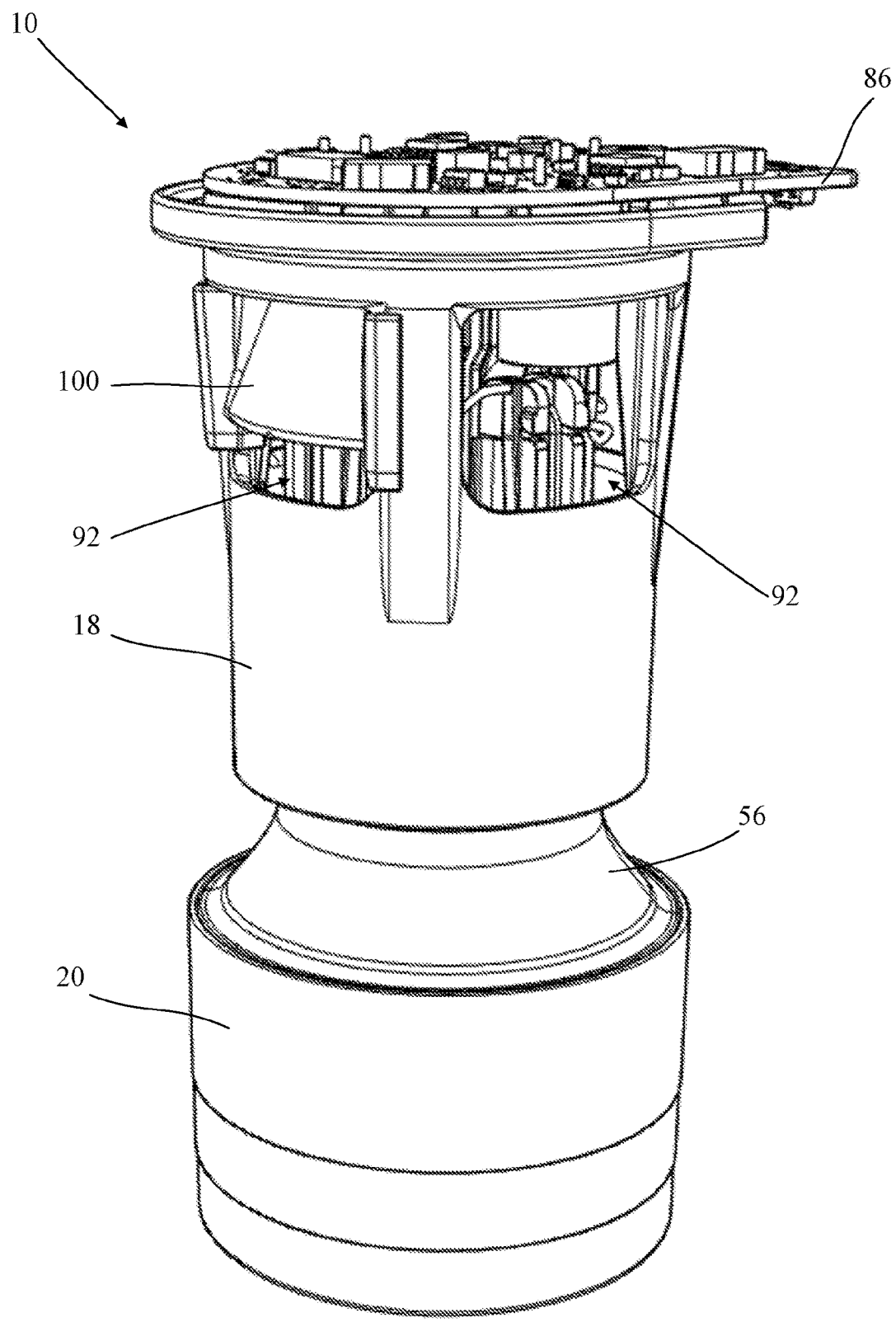
FIG. 1 is a perspective view of a compressor according to the present invention.
Figure 2:
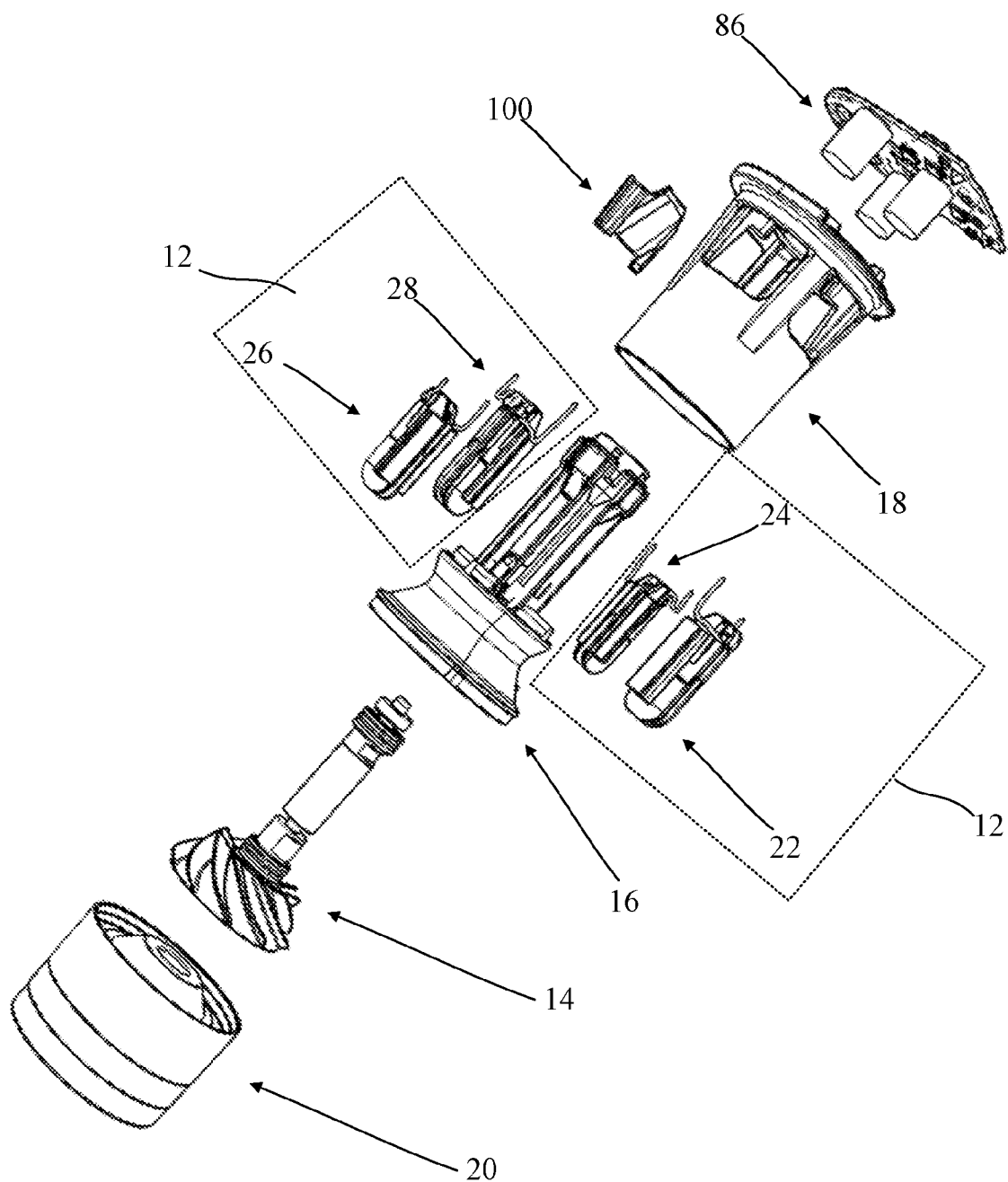
FIG. 2 is an exploded perspective view of the compressor of FIG. 1.

A compressor according to the present invention, generally designated 10, is shown in FIGS. 1 to 2.

The compressor 10 comprises a stator assembly 12, a rotor assembly 14, a frame 16, a housing 18, a diffuser 20, and a flow guide 100.

Figure 3:
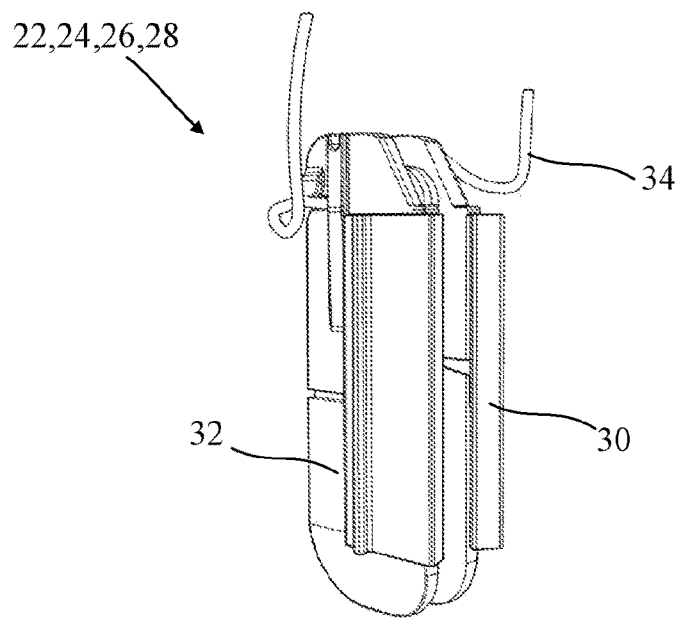
FIG. 3 is a perspective view of a stator element of the compressor of FIG. 1 in isolation.

The stator assembly 12 comprises four stator elements 22, 24, 26, 28. Each stator element 22, 24, 26, 28 comprises a stator core 30, a bobbin 32, and a winding 34, as shown in FIG. 3.

Figure 4:
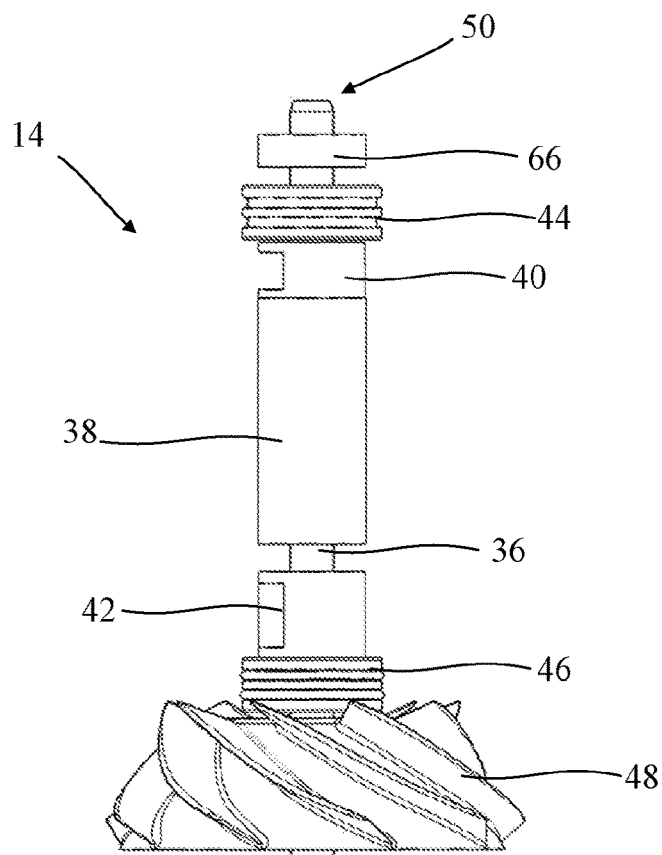
FIG. 4 is a perspective view of the rotor assembly of the compressor of FIG. 1 in isolation.

The rotor assembly 14 is shown in isolation in FIG. 4, and comprises a shaft 36 to which are mounted a rotor magnet 38, first 40 and second 42 balancing rings, first 44 and second 46 bearings, and an impeller 48.

The shaft 36 has first 50 and second 52 ends. The rotor magnet 38 is attached to the shaft 36 between the first 50 and second 52 ends, with the first 40 and second 42 balancing rings located on the shaft 36 either side of the rotor magnet 38. The first bearing 44 is attached to the shaft 36 toward the first end 50 of the shaft 36, and the second bearing 46 is attached to the shaft 36 toward the second end 52 of the shaft 36. The impeller 48 is attached to the shaft 36 at the second end 52 of the shaft 36.

Figure 5:
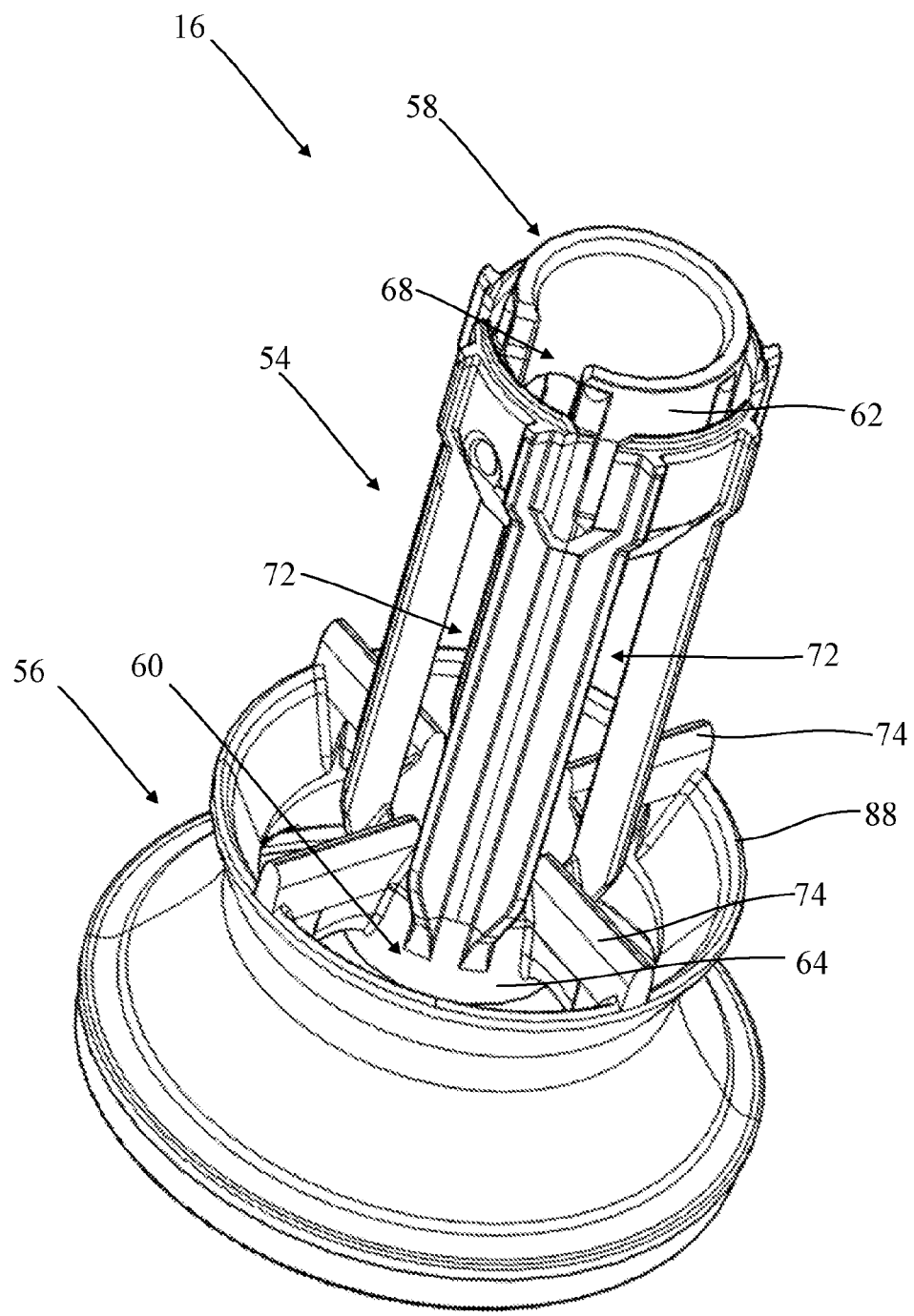
FIG. 5 is a perspective view of the frame of the compressor of FIG. 1 in isolation.

The frame 16 is shown in isolation in FIG. 5, and comprises a main body 54 and a shroud 56. The main body 54 is generally cylindrical and hollow in form, and has first 58 and second 60 ends. The first end 58 of the main body 54 defines a first bearing seat 62 for receiving the first bearing 44, and the second end 60 of the main body 54 defines a second bearing seat 64 for receiving the second bearing 46. The rotor assembly 14 is held within the frame 16 by the engagement of outer races of the first 44 and second 46 bearings with the respective first 62 and second 64 bearing seats.

The first bearing seat 62 is dimensioned to also receive, with clearance, a sensor magnet 66 attached to the second end 52 of the shaft 36, such that the sensor magnet 66 is free to rotate with the shaft 32 in use. An external surface of the first bearing seat 62 has a pocket 68 formed therein, with the pocket 68 receiving a hall sensor (not shown). The sensor magnet 66 and the hall sensor interact in use to provide an indication of the position of the rotor magnet 38.

The main body 54 has four mounting apertures 72, with the mounting apertures 72 being spaced evenly about the circumference of the main body 54 between the first 58 and second 60 ends of the main body 54. The mounting apertures 72 each receive a corresponding stator element 22, 24, 26, 28, with the stator elements 22, 24, 26, 28 being mounted to the main body 54 such that a stator core 30 extends at least partially through each mounting aperture 72. The mounting apertures 72 are located on the main body 54 such that the stator cores 30 are generally aligned with the rotor magnet 38 when assembled.

The shroud 56 is generally frusto-conical and hollow in form, and is attached to the second end 60 of the main body 54 in the region of the second bearing seat 64 by four struts 74. The shroud 56 is located such that the shroud 56 covers the impeller 48.

Figure 6:
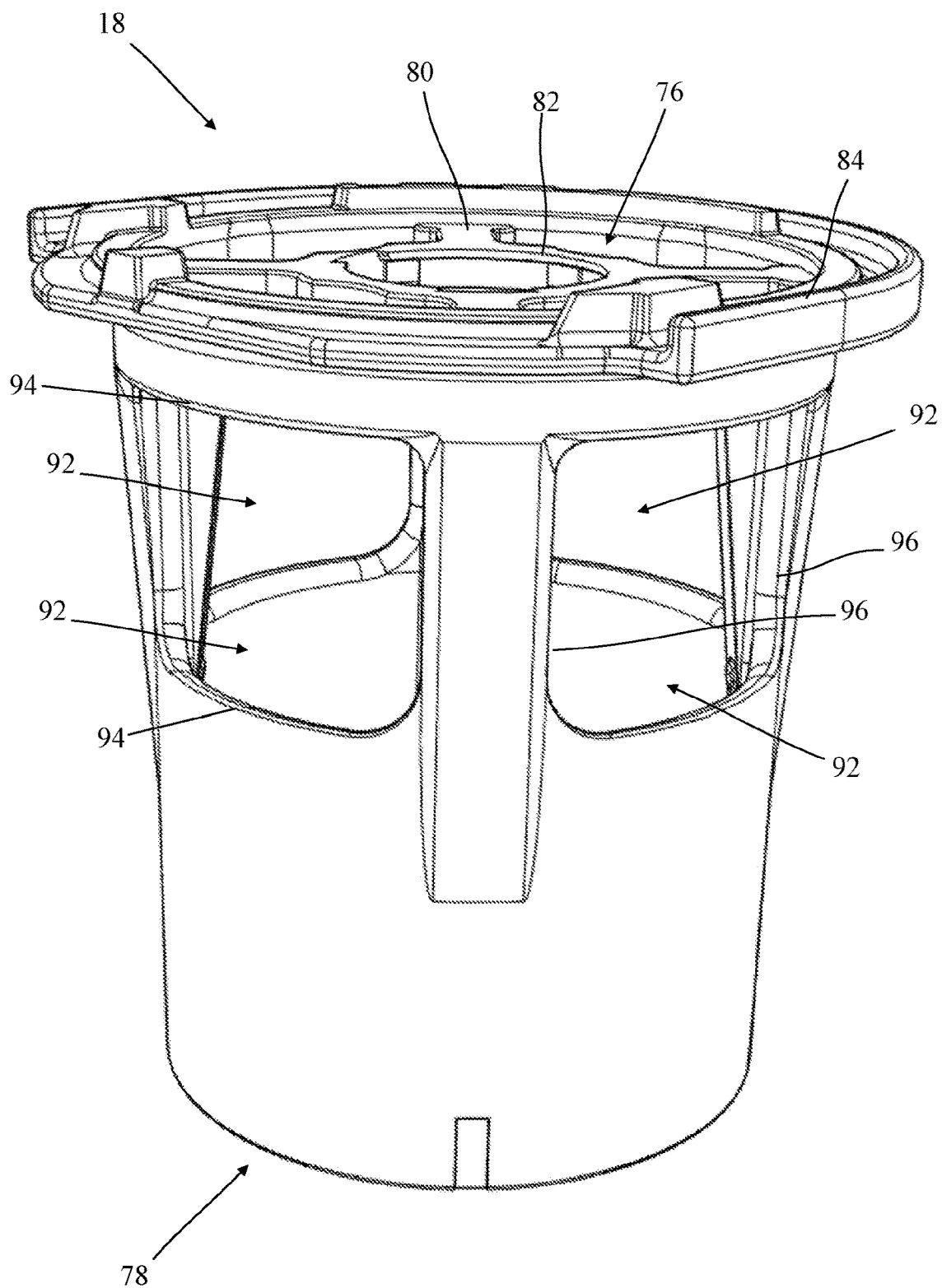
FIG. 6 is a perspective view of the housing of the compressor of FIG. 1 in isolation.

The housing 18 is shown in isolation in FIG. 6, is generally cylindrical and hollow in form, and has first 76 and second 78 ends. The first end 76 of the housing 18 is generally open, and has four struts 80 that meet to define a mount 82 for the first bearing seat 62 of the frame 16. The periphery of the first end 76 of the housing 18 is shaped to define a circuit board mount 84 which receives a printed circuit board 86 that is used to control the compressor 10 in use. The printed circuit board 86 is attached to the circuit board mount 84 such that the open first end 76 of the housing 18 is sealed by the printed circuit board 86, and the lower surface of the printed circuit board 86 is in fluid communication with the interior of the housing 18.

The second end 78 of the housing 18 is generally open, and receives an upper lip 88 of the shroud 56. The housing 18 is attached to the frame 16 at the upper lip 88 of the shroud 56 and at the second bearing seat 64, such that an annular channel 90 (seen more clearly in FIG. 9) is defined between the frame 16 and the housing 18. A portion of each of the stator elements 22, 24, 26, 28 is disposed in the annular channel 90.

The housing 18 has four air inlets 92 evenly spaced about the circumference of the curved surface of the housing 18. The four air inlets 92 are located between the first 76 and second 78 ends of the housing 18, and are closer to the first end 76 of the housing 18 than the second end 78 of the housing 18.

Each air inlet 92 is generally rectangular in form, such that each air inlet 92 has a first pair of opposing edges 94 and a second pair of opposing edges 96. The air inlets 92 are in fluid communication with the annular channel 90, such that a flow path through the compressor is defined by the air inlets 92, the annular channel 90, and an outlet 98 of the shroud 56 into the diffuser 20. Details of the diffuser 20 are not pertinent to the present invention and so will not be described here for the sake of brevity, save to say that the diffuser 20 is a three stage diffuser.

Figure 7:
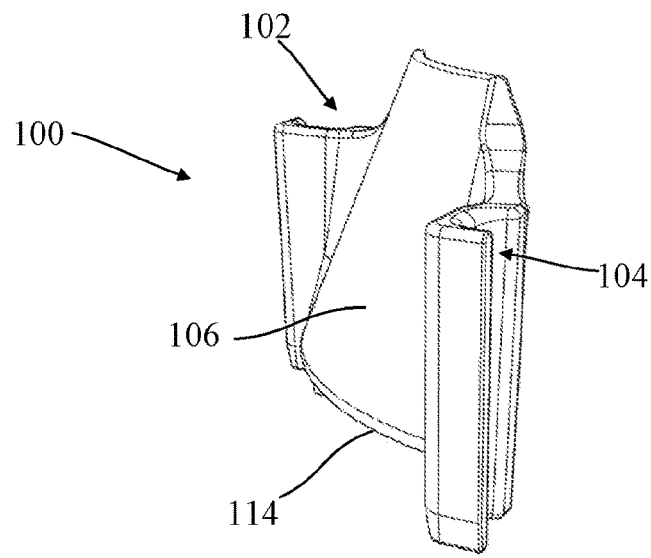
FIG. 7 is a perspective view of the flow guide of the compressor of FIG. 1 in isolation.

The flow guide 20 is shown in isolation in FIG. 7, and comprises lateral edges defining first 102 and second 104 clips, and a guide surface 106 located between the first 102 and second 104 clips. Each of the first 102 and second 104 clips has a mounting channel that co-operates with a respective one of the second pair of opposing edges 96 of an air inlet 92 to mount the flow guide 20 in said air inlet 92. The guide surface 106 is a slightly curved plane, and is obliquely angled relative to the first 102 and second 104 clips. The first 102 and second 104 clips extend axially past the guide surface 106 in one direction, whilst the guide surface 106 extends axially past the first 102 and second 104 clips in an opposing direction.

Figure 8:
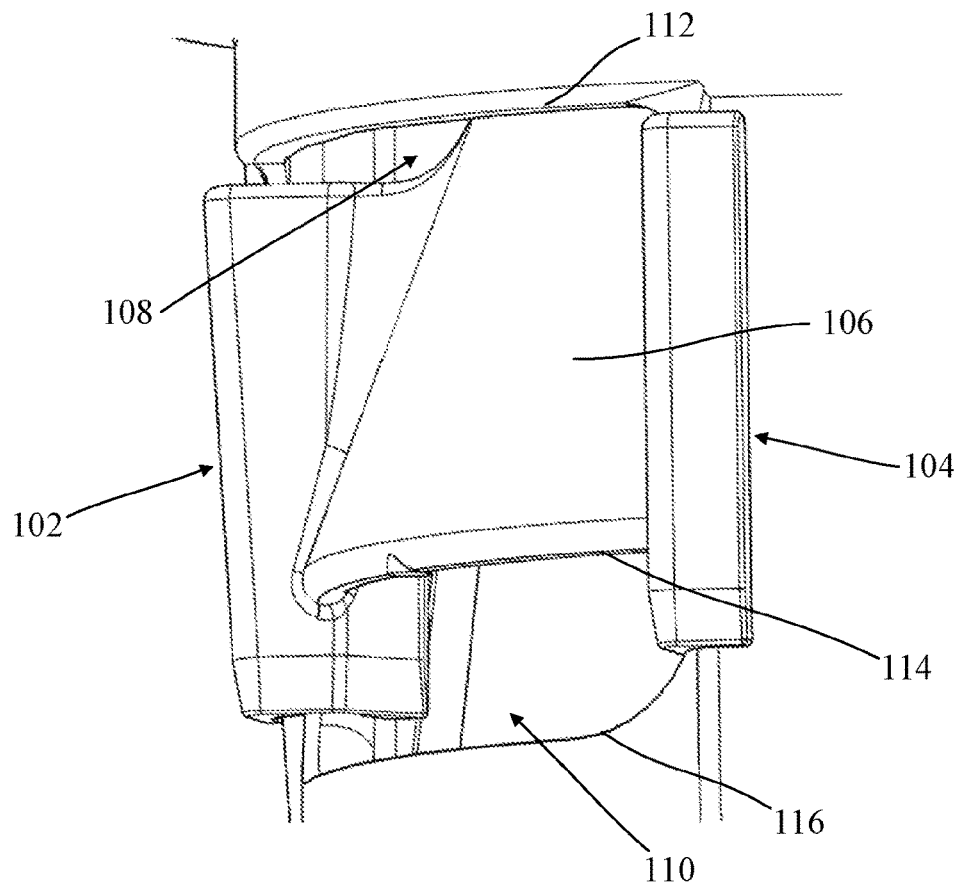
FIG. 8 is an enlarged view of the location of the flow guide in the compressor of FIG. 1.

An enlarged view of the flow guide 100 located within the air inlet 92 is shown in FIG. 8. As can be seen, the flow guide 100 is located such that the guide surface 106 is angled toward the first end 76 of the housing 18. The flow guide 100 splits the air inlet 92 in which it is located into a first inlet aperture 108 and a second inlet aperture 110. The first inlet aperture 108 is defined by the generally planar portion of the guide surface 106 and a first edge 112 of the first pair of opposing edges 94 of the air inlet 92, whilst the second inlet aperture 110 is defined by a lower edge 114 of the guide surface 106 and a second edge 116 of the first pair of opposing edges 94 of the air inlet 92. In such a manner the first inlet aperture 108 is generally occluded by the guide surface 106, whilst the second inlet aperture 110 is generally free from occlusions.

In use, current is pushed into the phase windings 34 of the stator elements 22, 24, 26, 28, such that a magnetic field is induced. The induced magnetic field interacts with the rotor magnet 38 to spin the shaft 36, and hence the impeller 48. The impeller 48 generates an airflow through the compressor 10.

Figure 9:
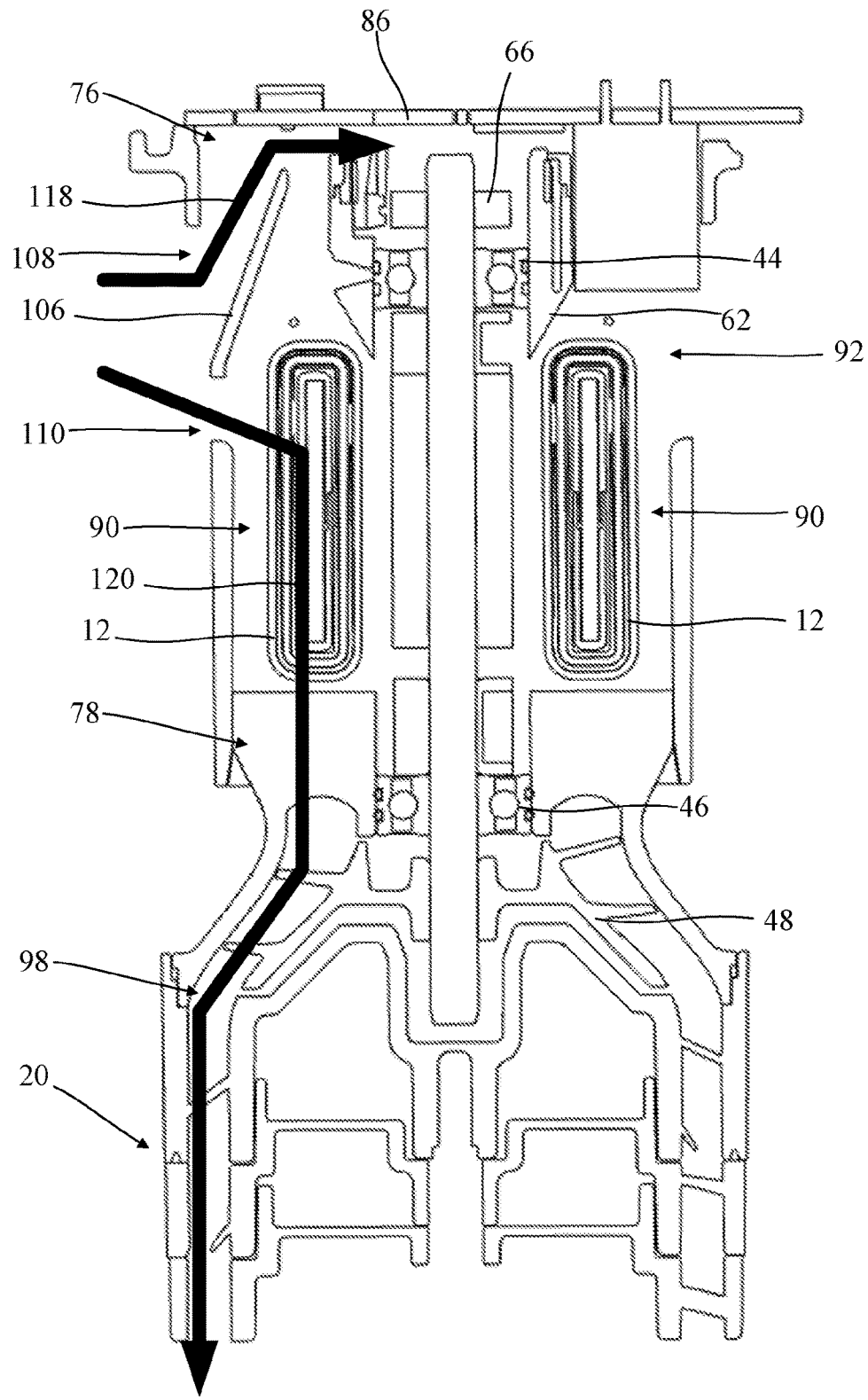
FIG. 9 is a schematic cross-sectional view indicating airflow through the compressor of FIG. 1.

The flow of air through the compressor 10 is indicated schematically in FIG. 9. Air generally enters the housing 18 via the air inlets 92, before flowing through the annular channel 90, past the impeller 48, through the outlet 98 of the shroud 56, and into the diffuser 20.

As mentioned above, the flow guide 100 is located in a given one of the air inlets 92 such that first 106 and second 108 inlet apertures are defined. For the given air inlet 92, the flow guide 100 splits air flowing through the air inlet 92 into a first airflow 118 and a second airflow 120. Due to the form of the guide surface 106, the first airflow 118 is directed toward the first end 76 of the housing 18, whilst the second airflow 120 is drawn toward the second end 78 of the housing 18 by the action of the impeller 48. It will of course be appreciated by a person skilled in the art that the first airflow 118 will turn and be drawn toward the second end 78 of the housing 18, once it has reached the first end 76 of the housing 18, under action of the impeller 48.

As discussed above, both the sensor magnet 66 and the first bearing 44 are located at the first end 76 of the housing 18. As the first airflow 118 is directed toward the first end 76 of the housing 18 by the flow guide 100, the first airflow 118 may pass over the sensor magnet 66 and the first bearing 44 in use. This may provide increased cooling of the sensor magnet 66 and the first bearing 44 relative to an arrangement where there is no flow guide, ie where airflow is not directed toward the first end 76 of the housing 18. Increased cooling of the sensor magnet 66 and the first bearing 44 may lead to improved lifetimes, and may enable the compressor to be run at a higher power, where more heat would typically be generated within the housing 18 in use.

Furthermore, as noted above the open first end 76 of the housing 18 is sealed by the printed circuit board 86, and the lower surface of the printed circuit board 86 is in fluid communication with the interior of the housing 18. As seen from FIG. 9 in particular, the lower surface of the printed circuit board 86 is in fluid communication with the first end 76 of the housing 18. Thus in use the first airflow 118 may be directed toward the lower surface of the printed circuit board 86, and the printed circuit board 86 may be provided with an increased level of cooling relative to an arrangement where there is no flow guide, ie where airflow is not directed toward the first end 76 of the housing 18.

Use of the flow guide 100 may further allow for increased flexibility in the choice of location of the air inlet 92, for example allowing for the air inlet 92 to be moved closer toward the second end 78 of the housing 18 whilst sill providing cooling airflow at the first end 76 of the housing 18.

Figure 10:
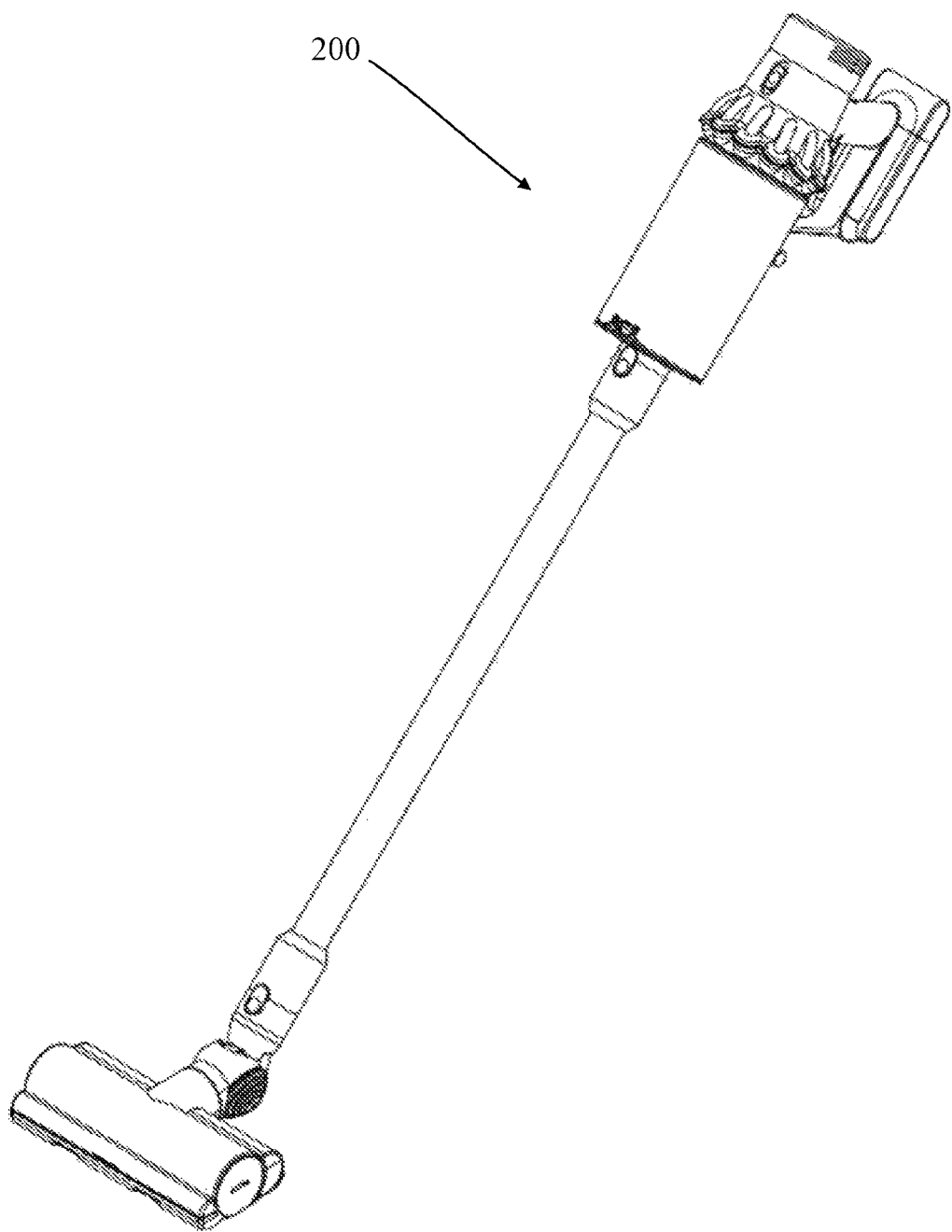
FIG. 10 is a perspective view of a vacuum cleaner incorporating the compressor of FIG. 1.

Whilst not shown in the figures, embodiments are also envisaged where a flow guide 100 is located in each air inlet 92. Such an arrangement may result in greater airflow directed toward the first end 76 of the housing 18, but may result in a drop in pressure rise across the compressor 10, and particularly may result in a loss of airwatts where the compressor 10 is used in a vacuum cleaner 200 (such a vacuum cleaner is shown in FIG. 10, although the details are not pertinent to the present invention and will not be described here for the sake of brevity). There is therefore a compromise to be reached. Use of a single flow guide 100 may provide adequate cooling at the first end 76 of the housing 18 without a significant reduction in pressure rise, whilst the use of multiple flow guides may give increased cooling but also result in a larger reduction in pressure rise.

The invention claimed is:

1. A compressor comprising:
a stator assembly, a rotor assembly, and a housing within which the stator assembly and the rotor assembly are located, wherein the housing comprises a first end, a second end, and an air inlet duct disposed between the first and second ends, the inlet duct including an inlet opening located between the first and second ends, the compressor comprises a flow guide disposed within the air inlet, and the flow guide is configured to split air flowing through the air inlet in use into a first airflow toward the first end of the housing and a second airflow toward the second end of the housing.

2. The compressor as claimed in claim 1, wherein the air inlet is spaced apart from the first and second ends of the housing.

3. The compressor as claimed in claim 1, wherein the first end of the housing is closed.

4. The compressor as claimed in claim 3, wherein the first end of the housing is closed by control circuitry of the compressor.

5. The compressor as claimed in claim 1, wherein the rotor assembly comprises at least one magnet which is disposed within the first end of the housing.

6. The compressor as claimed in claim 5, wherein the at least one magnet is disposed within the first end of the housing such that the at least one magnet is at least partially misaligned with the air inlet.

7. The compressor as claimed in claim 1, wherein the housing is substantially cylindrical in global form, and the air inlet is located on a curved surface of the housing.

8. The compressor as claimed in claim 1, wherein the flow guide and the housing comprise separate components attached to one another by fixing means.

9. The compressor as claimed in claim 8, wherein the fixing means comprise at least one clip formed on the flow guide and/or the housing.

10. The compressor as claimed in claim 8, wherein the air inlet comprises a window formed in the housing, the window having at least two opposing edges, and the flow guide comprises at least two clips that are engagable with the at least two opposing edges to locate the flow guide within the air inlet.

11. The compressor as claimed in claim 10, wherein the flow guide comprises a guide surface, and the guide surface is obliquely angled relative to the at least two clips.

12. The compressor as claimed in claim 1, wherein the rotor assembly comprises a rotor magnet and at least one bearing, the rotor magnet and the at least one bearing being disposed in the housing at least partially between the air inlet and the second end of the housing.

13. The compressor as claimed in claim 1, wherein the rotor assembly comprise a first bearing located at the first end of the housing and a second bearing located at the second end of the housing.

14. The compressor as claimed in claim 1, wherein the stator assembly comprises at least one stator core, and at least one phase winding wound around the at least one stator core, the at least one stator core and the at least one phase winding being disposed in the housing at least partially between the air inlet and the second end of the housing.

15. The compressor as claimed in claim 1, wherein the housing comprises a plurality of air inlets and a single flow guide, with the single flow guide disposed within a single air inlet.

16. The compressor as claimed in claim 1, wherein the housing comprises a plurality of air inlets and a plurality of flow guides, each flow guide being disposed within a respective air inlet.

17. A vacuum cleaner comprising the compressor according to claim 1.

* * * * *